A. A. OLLENBURG.
BUMPER BRACKET FOR AUTOMOBILES.
APPLICATION FILED JAN. 3, 1916.

1,300,858.  Patented Apr. 15, 1919.

Inventor
Arthur A. Ollenburg
By Flanders, Bothun, Fawsett & Bothun
Attorneys

UNITED STATES PATENT OFFICE.

ARTHUR A. OLLENBURG, OF MILWAUKEE, WISCONSIN, ASSIGNOR TO GEMCO MANUFACTURING COMPANY, OF MILWAUKEE, WISCONSIN, A CORPORATION OF WISCONSIN.

BUMPER-BRACKET FOR AUTOMOBILES.

1,300,858.  Specification of Letters Patent.  Patented Apr. 15, 1919.

Application filed January 3, 1916. Serial No. 69,775.

*To all whom it may concern:*

Be it known that I, ARTHUR A. OLLENBURG, a citizen of the United States, residing at Milwaukee, in the county of Milwaukee and State of Wisconsin, have invented certain new and useful Improvements in Bumper-Brackets for Automobiles, of which the following is a specification, reference being had to the accompanying drawing, forming a part thereof.

The main objects of this invention are to facilitate the assemblage and separation of the relatively movable parts of the bracket; to avoid unnecessary parts or fastenings which are liable to become loose and rattle, or detached and lost; and generally to simplify and improve the construction and increase the convenience of this class of devices.

It consists in the construction, arrangement and combination of parts, as hereinafter particularly described and pointed out in the claims.

In the accompanying drawing like characters designate the same parts in the several figures.

Figure 1:
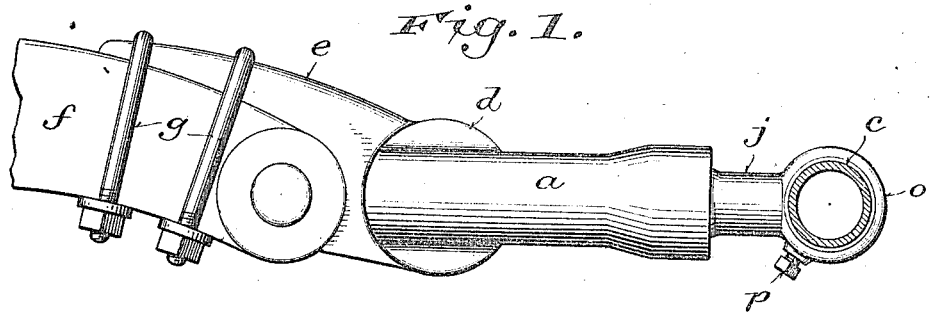
Figure 2:
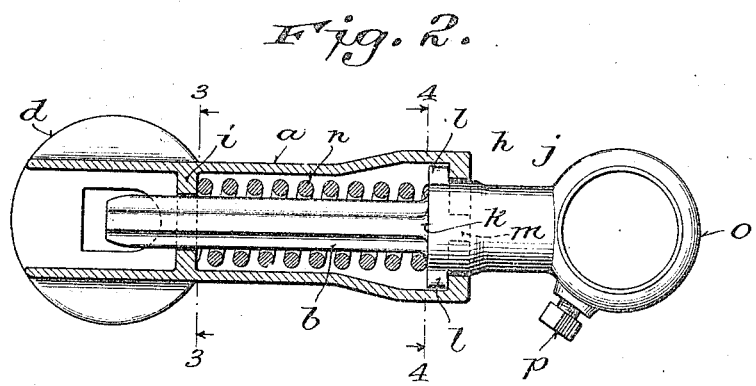
Figure 3:
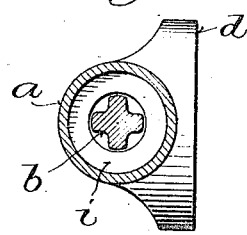
Figure 4:
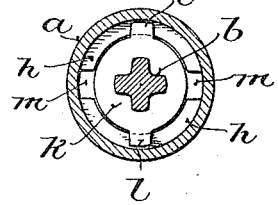

Figure 1 is an inside elevation of a bumper bracket embodying the invention in connection with one of various means for attaching the bracket to a car and one of various forms of bars which may be used with the bracket; Fig. 2 is a vertical longitudinal section of the bracket on an enlarged scale; and Figs. 3 and 4 are vertical cross-sections on the lines 3, 3, and 4, 4, respectively, Fig. 2.

A bracket constructed in accordance with the invention comprises two main members, a spring barrel or housing $a$, and a stem $b$ guided and movable axially therein and provided with means for attaching it to a bar $c$.

The barrel or housing $a$ may be attached to any convenient part of the frame or to a spring of an automobile in various ways.

As shown in Fig. 1, it is formed with a jaw $d$, which is pivotally and adjustably connected in a well known manner by a bolt (not shown) with a corresponding jaw on a coupling member $e$, fastened to a side bar $f$ of the frame by clips $g$.

This connection of the bracket with the frame provides for vertical adjustment of the bar $c$, but the housing $a$ may be directly and rigidly attached to the frame or a part of the automobile.

The barrel or housing $a$ is formed at the front end with an inturned notched flange $h$, as shown in Figs. 2 and 4, and at a distance to the rear of said flange with an internal spring seat, $i$, as shown in Figs. 2 and 3.

The stem $b$ adjacent to its rear end is freely fitted and guided in the opening in the spring seat $i$, and at its front end, which projects from the housing, has an enlarged shank $j$, freely fitting and guided in a larger opening in the flanged end of the housing. This shank at its junction with the smaller part of the stem $b$ forms a shoulder or spring seat $k$ and is provided with outwardly projecting lugs $l$, which are arranged to register with and pass through the notches $m$ in the flange $h$ when one part of the bracket is turned around its longitudinal axis into abnormal position relative to the other part.

A spiral spring $n$, which is made to pass freely through the opening in the flanged front end of the housing $a$, is inserted with the stem $b$ therein and bears, when the parts are assembled as shown in Figs. 1 and 2, at its rear end against the seat $i$ in the housing and at its front end against the seat $k$ on the stem.

By turning one part of the bracket relatively to the other till the lugs $l$ are out of register with the notches $m$ and engage with the inner side of the flange $h$, the housing $a$ and the stem $b$, when attached to the frame or a part of an automobile and to a bar $c$, are locked and held together in the proper working position relative to each other.

The spring $n$ being more or less compressed when the parts are thus assembled takes up all play or lost motion, prevents rattling and wear, and at the same time permits the bar $c$ to yield rearwardly in case it hits or is hit by an obstruction or other body.

The front end of the stem $b$ is formed or provided with a head or connection of appropriate design for attachment to a bumper bar of any desired shape. In the present instance it is formed with a sleeve or collar $o$, which is provided with a set screw $p$ for fastening it to and adjusting it lengthwise of a round or cylindrical bar $c$, as shown in Fig. 1.

With the construction herein shown and described, the relatively movable parts of a bumper bracket are easily and quickly assembled and taken apart; and, when assembled and applied to an automobile, are interlocked and securely held together without bolts, nuts, screws, or other separate fastenings which are liable to get loose and rattle or detached and lost. The bumper spring $n$ is also completely inclosed, concealed and protected.

Various changes in the details of construction of the device may be made without departure from the principle and scope of the invention as defined in the following claims.

I claim:

1. A bumper bracket comprising a spring housing having an inturned notched flange at one end and a spring seat at a distance from said flange, a stem guided and movable axially in the flange and spring seat of the housing and provided with a spring seat and with a lug arranged to register with the notch in said flange when one of the parts is turned on its axis into abnormal position relative to the other, and a spring bearing at one end against the seat in the housing and at the other end against the seat on the stem and adjacent to the point of engagement of the lug on the stem with the flange at the outer end of the housing.

2. A bumper bracket comprising a spring housing provided with means for attachment to a car and having an inturned notched flange at one end and an internal spring seat at a distance from the flange, the opening in the flanged end of the housing being larger than the opening in the spring seat, a stem guided and movable axially in the openings in the spring seat and flanged end of the housing and having an enlarged shank forming a spring seat and provided with means for attachment to a bumper bar and with a lug which is arranged to register with the notch in said flange when one of the parts is turned relatively to the other into abnormal position, and a spring bearing at one end against the seat in the housing and at the other end against the seat on the stem adjacent to the point of engagement of the lug on the stem with the flange at the outer end of the housing and adapted to pass through the opening in the flanged end of the housing.

In witness whereof I hereto affix my signature in the presence of two witnesses.

ARTHUR A. OLLENBURG.

Witnesses:
 CHAS. L. GOSS,
 L. A. ROASCH.